(12) United States Patent
Moen et al.

(10) Patent No.: US 7,514,893 B2
(45) Date of Patent: Apr. 7, 2009

(54) METHOD FOR USING A WEARABLE INTERACTIVE MOVABLE DEVICE

(76) Inventors: Jin Moen, Garvargatan 20, 112 21 Stockholm (SE); Johan Sandsjo, Olivedalsgatan 7B, 413 10 Gothenburg (SE)

( * ) Notice: Subject to any disclaimer, the term of this patent is extended or adjusted under 35 U.S.C. 154(b) by 212 days.

(21) Appl. No.: 11/743,198

(22) Filed: May 2, 2007

(65) Prior Publication Data

US 2007/0278981 A1    Dec. 6, 2007

Related U.S. Application Data

(60) Provisional application No. 60/746,307, filed on May 3, 2006.

(51) Int. Cl.
*B25J 5/00* (2006.01)
(52) U.S. Cl. ............... 318/568.12; 318/568.16; 318/651; 318/560; 901/1; 901/8; 901/46
(58) Field of Classification Search ............ 318/568.12, 318/568.16, 651, 560; 901/1, 8, 46
See application file for complete search history.

(56) References Cited

U.S. PATENT DOCUMENTS

| 5,336,983 | A | * | 8/1994 | Watanabe | 318/651 |
| 5,581,167 | A | * | 12/1996 | Kato et al. | 318/609 |
| 6,166,504 | A | * | 12/2000 | Iida et al. | 318/560 |
| 7,190,141 | B1 | * | 3/2007 | Ashrafiuon et al. | 318/568.12 |
| 7,313,463 | B2 | * | 12/2007 | Herr et al. | 700/245 |
| 7,408,314 | B2 | * | 8/2008 | Hayashi | 318/568.12 |
| 7,482,775 | B2 | * | 1/2009 | Zaier | 318/568.12 |

* cited by examiner

*Primary Examiner*—Bentsu Ro
*Assistant Examiner*—Thai Dinh
(74) *Attorney, Agent, or Firm*—Fasth Law Offices; Rolf Fasth

(57) ABSTRACT

The method is for interacting with a wearable interactive device. A pathway extends through an interactive device that is non-slidably attached to the pathway. The pathway has a first end and a second end. At least one end of the pathway is attached to a body of a user. The user accelerates the device in a first direction. A sensor senses the acceleration in the first direction. The sensor triggers a motor to move gears so that the device travels towards the first end of the pathway. The user accelerates the device in a second opposite direction. The sensor triggers the device to move towards the second end of the pathway.

9 Claims, 2 Drawing Sheets

_US 7,514,893 B2_

METHOD FOR USING A WEARABLE INTERACTIVE MOVABLE DEVICE

PRIOR APPLICATION

This is a US national patent application claiming priority from U.S. provisional patent application Ser. No. 60/746,307, filed 3 May 2006.

TECHNICAL FIELD

The method relates to a method for using a wearable interactive movable device. The device is an interaction concept that can be used for or by various products, contexts, users, etc. The device can be controlled by different kinds of inputs including, but not limited to, movement, sound, or temperature, and transfer this to different kinds of output including, but not limited to, self-movement, sound, or light.

BACKGROUND OF INVENTION

Various interactive devices have been available in the past. For example, interactive embodiments that may visually represent the user with bodily and physical appearances have been used in virtual environments for some time. However, the emphasis of today's devices is often technology driven. When the interaction is based on and with the focus on technology, the resulting device may not fully take advantage of the user's need and natural behavior when the device is used. There is a need for an interactive device that is fun to use and that takes full advantage of the natural behavior of the user in order to focus on the aesthetic experience of the interaction between human movement and technology.

SUMMARY OF INVENTION

The method of the present invention provides a solution to the above-outlined problems. More particularly, the method is for interacting with a wearable interactive and movable device. A pathway such as a wire extends through at least one interactive movable device that is non-slidably attached to the wire. The wire has a first end and a second end. Preferably, at least one end of the wire is attached to a body of a user. The device can also be used by a plurality of users, by attaching the first end to the body of the first user, and the second end to the body of the second user or by draping the wire around the other users. The user accelerates the device in a first direction. An accelerometer or any other sensor device such as a gyro senses the acceleration in the first direction. The sensor triggers a motor, or any other organ/arrangements that make the device move along the pathway, to move gears so that the device travels towards the first end of the wire for a predetermined time period or any other predetermined or random behavior. The user accelerates the device in a second opposite direction. The sensor triggers the device to move towards the second end of the wire. The device's movement could also be triggered by other input than motion, such as sound, speech, etc. The movement input or other input could also cause output such as sound, lights, in addition to or replaced by the device's movement.

DETAILED DESCRIPTION

Figure 3:
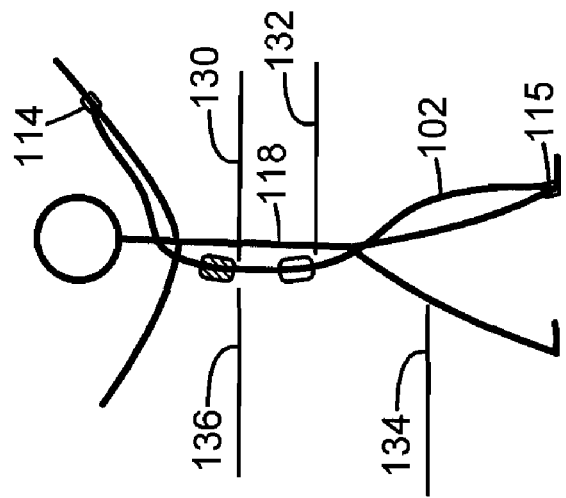
FIG. 3 is a schematic view of the user in the raised position.
Figure 4:
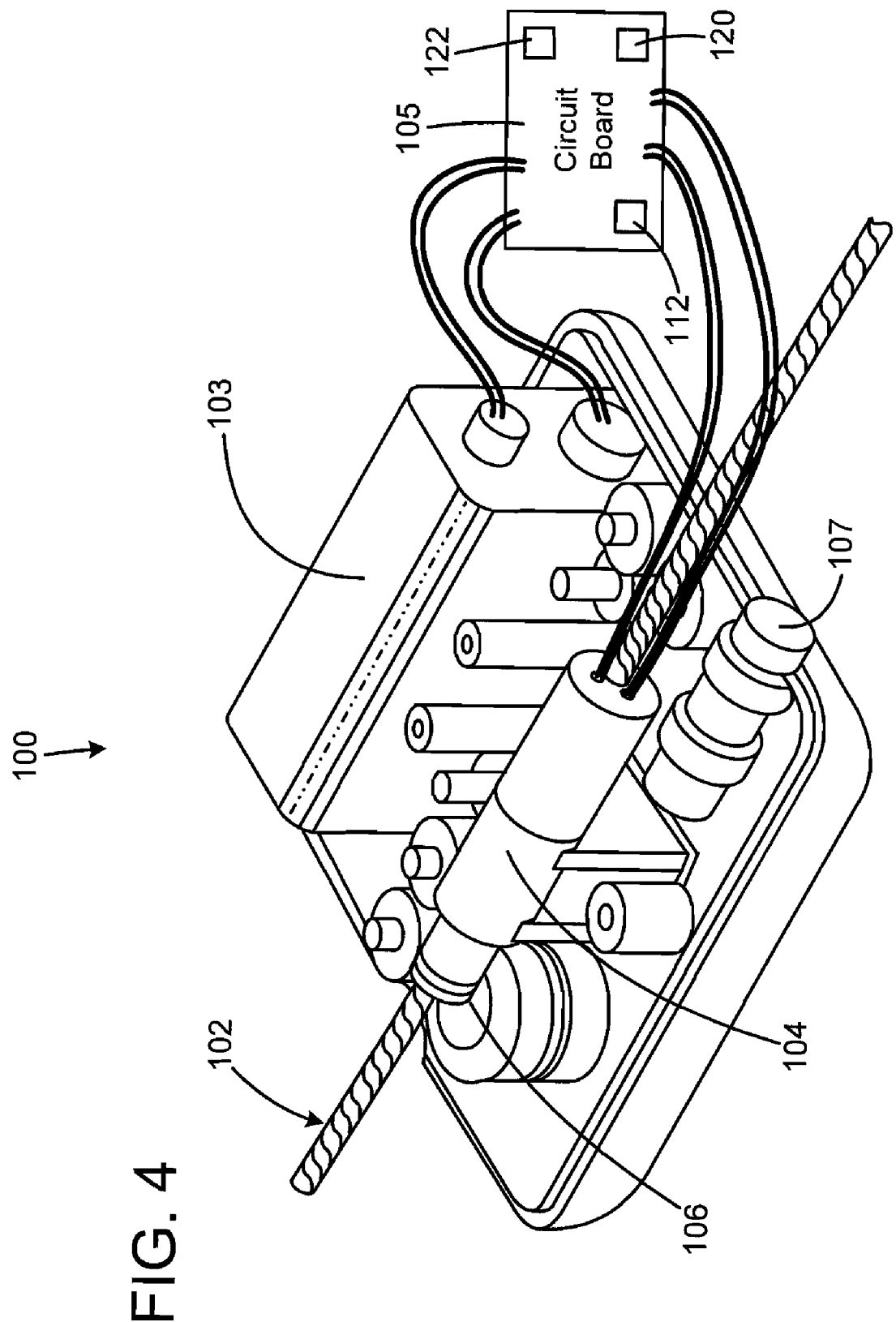
FIG. 4 is a perspective view of the device with the cover removed.

With reference to FIGS. 1-4, the device 100 of the present invention has a pathway 102 extending therethrough so that the device 100 may move up and down the pathway 102 when it is triggered to move or to stand still. The pathway 102 may be any suitable flexible and bendable or stiff pathway such as wire, thread, chain, non-flexible tracks or any other pathway for the device to follow. Preferably, the device 100 is non-slidably attached to the pathway 102. The pathway may be about 1-2.5 meters long or any other suitable distance. Each end of the pathway 102 may have fasteners 114, 115, such as Velcro straps, so that one or both ends of the pathway 102 may be removably attached to a body 116 or a user 118. The ends may also be attached to other attachments that in their turn are attached to a user/person or body, machine etc. As best shown in FIG. 4, the device 100 has a motor 104 and cog/gear wheels 106, or any other arrangements that facilitates the device's movement along the pathway, as well as the possibility of holding its position stand still, that are in operative engagement with the pathway 102. The device 100 also has a battery 103 or any other suitable power source that is rechargeable or replaceable, a circuit board 105 and an on/off button 107. The board 105 may be connected to a sensor 112, micro-controller 120 and motor controller 122. The sensor 112 may be an accelerometer that senses or captures the movement of the device such as when the device 100 is moved upwardly, downwardly or in any direction by the user 118. The sensor may also be a motion sensor and/or other sensors for sound etc. The movement could be triggered by other technical factors such as magnetism, induction, air pressure differences etc. For example, the sensor 112 senses acceleration and deceleration of the device 100. The sensor 112 could also be triggered by other input such as sound, temperature, vibration, pressure or any other suitable input. The device may have several sensors that are either identical or different. For example, the sensor may be designed to sense accelerations and decelerations in the xyz-dimensions. In this way, the sensor 112 may not be activated or does not provide any output in terms of additional motion along the pathway when the device 100 is still or moving at a constant velocity.

The device may be configured to keep track of its own position along the pathway 102 including when the device 100 is at an end or beginning of the pathway. The device 100 can communicate, both wirelessly and wired, with an external device such as computer, mobile telephone, personal digital assistance or any other electronic device if desired.

The device 100 also has the programmable micro-controller 120 that may be used to program different behaviors of the device such as the direction and how long the device 100 is to move along the pathway 102 as the sensor 112 senses movements or other sensors senses various input. The micro-controller is connected to the motor controller 122 that controls the motor or alternative motion trigger arrangements.

Figure 2:
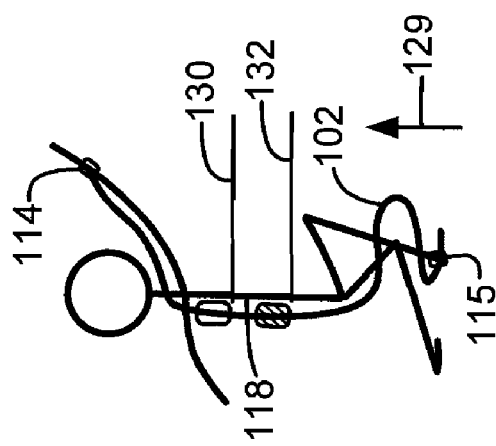
FIG. 2 is a schematic view of the user in a lowered position.
Figure 1:
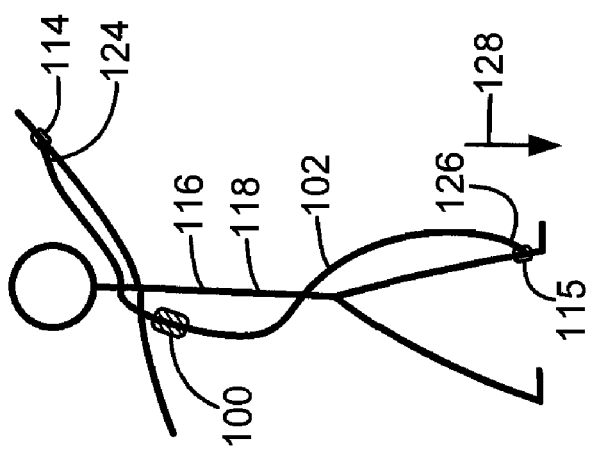
FIG. 1 is a schematic view of a user in a raised position with the device in a raised position.

In operation, the user may attach one or both ends of the wire to the body. For example, the user 118 may attach fastener 114 on a wrist and fastener 115 on an ankle so that the device 100 is disposed on the pathway 102 between the outer ends 124, 126 thereof. In this way, the device 100 hangs on the body 116 of the user 118 and is non-slidably attached to the wire. The device 100 has gears 106 that grab the pathway 102 so that the device 100 may not slide when the device 100 is stationary or when it is programmed to be stationary. The sensor 112 may sense accelerations and decelerations of the device 100 in space as the user 118 moves the device 100. Preferably, the sensor 112 senses movements of the device 100 at certain time intervals. The sensor 112 may also continuously sense movements of the device 100. The sensor 112 is through one or more micro-controllers in operative engagement with the motor 104 so that the sensor 112 triggers the motor 104 to operate when the sensor 112 senses that the device 100 is accelerated in space. For example, the sensor may send its data to a micro-controller. The micro-controller then interpret the data, and decide which outputs it should trigger, e.g. movement, stillness, sound, lights, etc. The possible interpretations can be controlled through programming of the micro-controller. In this way, the device 100 may move upwardly towards the fastener 114 or downwardly towards the fastener 115 (as shown in FIG. 2) along the pathway 102 when the motor is triggered to operate by the sensor 112. It may be possible to program the device so that the device 100 only moves when the sensor is not activated such as when the velocity is constant. More particularly, the sensor 112 senses an accelerating movement in a downward movement, such as when the user 116 bends the user's knees, as indicated by a first arrow 128. This triggers the motor 104 to start to drive the gears 106 so that the device 100 travels along the pathway 102 from a position 130 to a lower position 132 on the wire. It may also be possible to design the device 100 so that the device travels in the opposite direction or so that the device rotates about the pathway 102.

The user may make the device 100 climb on the pathway 102 by moving standing up again, as shown in FIG. 3 and indicated by the second arrow 129 in FIG. 2, or raising the arm upwardly so that the device 100 is moved upwardly from a position 134 (kneeled-down position shown in FIG. 2) to a position 136 (raised position shown in FIG. 3) in space. The sensor 112 senses this upward acceleration and triggers the motor to move the device upwardly from the position 132 on the pathway 102 back to position 130 on the pathway 102. The arm may be used to indicate the direction of how the user intends the device to travel on the pathway 102. The device 100 may thus be programmed so that an upward movement of the device 100 in space also triggers the device 100 to travel upwardly on the pathway 102 for a predetermined time such as 5 seconds or any other suitable time period or any other suitable behavior such as its speed. In this way, the length of the movement of the device 100 on the pathway 102 may be independent of the length of the movement of the device 100 by the user 118. Once the device 100 has been triggered to move, it may be set to move the predetermined time even though the user may have stopped moving the device 100 in space. When the predetermined time is up, the device 100 stops on the wire. To make the device 100 move again on the wire, it may be necessary to accelerate or decelerate the device in space again. Of course, the device 100 could be programmed to travel in the opposite direction.

As indicated above and shown in FIG. 2, the user may make the device 100 move downwardly by bending down a bit so that the sensor 112 senses a downward movement. The device 100 then travels downwardly the predetermined time. The user may then make the device go upwardly by standing up, as shown in FIG. 3, so that the sensor 112 senses the upward movement of the device 100 and triggers the device to climb on the pathway 102. The device 100 could be programmed so that it either stops traveling on the wire or starts traveling in the opposite direction when the device 100 reaches one of the two ends of the pathway 102.

The device is able to keep track of its own position on the pathway, including detection of end positions. The device can communicate, both wirelessly and wired, with an external device, e.g. computer, mobile phone, PDA, etc.

While the present invention has been described in accordance with preferred compositions and embodiments, it is to be understood that certain substitutions and alterations may be made thereto without departing from the spirit and scope of the following claims.

The invention claimed is:

1. A method for interacting with a wearable interactive device, comprising:
   providing a pathway extending through an interactive movable device, the device being non-slidably attached to the pathway, the pathway having a first end and a second end;
   attaching at least one end of the pathway to a body of a user;
   the user accelerating the device in a first direction;
   an sensor sensing the acceleration in the first direction;
   the sensor triggering the device to travel towards the first end of the pathway;
   the user accelerating the device in a second opposite direction; and
   the sensor triggering the device to move towards the second end of the pathway.

2. The method according to claim 1 wherein the method further comprises the device traveling along the pathway a predetermined time.

3. The method according to claim 1 wherein the method further comprises the device climbing upwardly on the pathway against gravitational forces.

4. The method according to claim 3 wherein the method further comprises the device standing still on the pathway against gravitational forces.

5. The method according to claim 1 wherein the method further comprises the device traveling a distance on the pathway that is independent of a distance the device is moved by the user.

6. The method according to claim 1 wherein the method further comprises moving the device upwardly to trigger the device to climb upwardly on the pathway.

7. The method according to claim 6 wherein the method further comprises moving the device downwardly to trigger the device to move downwardly on the pathway.

8. The method according to claim 1 wherein the method further comprises the sensor sensing both accelerations and decelerations to trigger the motor to move the device on the pathway.

9. The method according to claim 1, wherein the method further comprising attaching both ends of the pathway to the body.

* * * * *